OR 3,506,916

April 14, 1970 S. A. MIXSELL ET AL 3,506,916

TELEVISION AUDIENCE SURVEY SYSTEM

Filed Jan. 19, 1968 3 Sheets-Sheet 1

INVENTORS
STEPHEN A. MIXSELL
HANSEL B. MEAD

BY LeBlanc & Shur.
ATTORNEYS

TELEVISION AUDIENCE SURVEY SYSTEM

Filed Jan. 19, 1968 3 Sheets-Sheet 2

INVENTORS
STEPHEN A. MIXSELL
HANSEL B. MEAD

BY LeBlanc & Shur
ATTORNEYS

INVENTORS
STEPHEN A. MIXSELL
HANSEL B. MEAD

BY *Le Blanc & Shur*
ATTORNEYS

United States Patent Office 3,506,916

Patented Apr. 14, 1970

3,506,916
TELEVISION AUDIENCE SURVEY SYSTEM

Stephen A. Mixsell, Melbourne, and Hansel B. Mead, Eau Gallie, Fla., assignors, by mesne assignments, to Teltronic Measurement Systems, Inc., New York, N.Y., a corporation of Delaware Continuation-in-part of application Ser. No. 608,589, Jan. 11, 1967. This application Jan. 19, 1968, Ser. No. 699,078

Int. Cl. H04h *9/00;* H04b *1/60*

U.S. Cl. 325—31 6 Claims

ABSTRACT OF THE DISCLOSURE

Disclosed is a radio and television audience survey system particularly suited for monitoring the listening and viewing habits of CATV subscribers. Local oscillator signals are picked off the CATV cables "upstream" of the cable amplifiers and separated by a spectrum analyzer technique. Each set produces a signal of slightly different frequency and these signals are converted to pulses and supplied to a counter. The counter presents a continuously updated and automatically averaged display of the current share and rating for each television channel being monitored.

This application is a continuation-in-part of copending application Ser. No. 608,589 filed Jan. 11, 1967.

This invention relates to a device for monitoring electrical signals from the local oscillators of radio and television receivers, and more particularly is directed to a system for ascertaining the listening habits of persons subscribing to the services of a Community Antenna Television System, better known as CATV.

With the increase in the cost of advertising time on radio and television stations and particularly the latter, sponsors have become more concerned with the scope of coverage afforded by advertising of this type. In recent years the television rating systems have received much publicity and are believed to have a significant effect on the lives of many television shows.

In assignee's U.S. Patent 3,299,355, there is disclosed a system and method for monitoring radio and television receivers which for the first time rapidly acquire information in very large quantities. This overcomes the difficulties and disadvantages encountered in some other type systems which rely for their results on a very small sample of the receiving sets actually being used in any given locality. The system of that patent is particularly designed for use in an aircraft but may also be used on a tower in conjunction with a rotating antenna at the receiver which rotates or otherwise sweeps over the area to be monitored. However, the patented system is primarily designed to receive signals radiated from the local oscillators of the television or radio receiving sets by way of a remote monitor antenna.

In many areas, where television reception is limited due to terrain, distance or for other reasons, community antenna television systems, better known at CATV, have been provided to improve the reception. In systems of this type, one or more receiving antennas are strategically located to provide optimum reception and the signals from this community antenna are supplied by wires or cables to the individual subscriber sets for which service the subscriber pays a periodic sum to the operator or owner of the CATV system. CATV systems have been increasing in popularity due in large part to the improved television reception which they provide and also due to the greater variety of selection in programs which they make possible. In these systems the subscriber's set is connected directly to the CATV branch cable and no subscriber set television antenna from which sufficiently strong radiated signals can be detected is necessary.

The present invention is directed to a system of the same general type as that of assignee's U.S. Patent 3,299,355 but modified in such a way as to make it possible to ascertain the listening habits of subscribers to CATV systems. It has been found that the signal from the local oscillator of the TV set connected to a CATV system is present on the cable which provides that set with its picture and audio. However, this local oscillator signal will not pass "upstream" through any of the conventional CATV branch amplifiers. Thus, by tapping into the CATV cable immediately after or downstream of the CATV amplifiers, it is possible to detect and identify the set connected to the cable; that is, the frequency of the local oscillator signals differ, and the sets tuned to the same TV channel produce local oscillator signals which differ by a detectable amount.

The different local oscillator signals are detected in the present invention by scanning the television local oscillator band with a moving frequency slot. In the preferred embodiment, the width of the band scanned is 3.8 megacycles and the moving frequency slot has a bandwidth of 8 kilocycles.

A further important feature of the present invention includes the provision of a novel counting system for ascertaining the actual rating and share of listeners each of the broadcast programs may have at any particular time. In order to provide a continuous and substantially instantaneous record and/or display of the number of listeners to the respective television stations, the local oscillator band is swept at repeated closely spaced intervals such as once a second to once every minute. In the present invention, the resulting count is automatically averaged in accordance with the sweep rate to provide an accurate count for all sets being monitored.

It is therefore one object of the present invention to provide an improved audience sampling survey system for ascertaining the listening habits of radio and television listeners.

Another object of the present invention is to provide a substantially instantaneous electronic system for ascertaining the listening habits of cable television subscribers.

Another object of the present invention is to provide an apparatus and method which make it possible to distinguish between the local oscillator frequencies of television sets connected to the cables of a community antenna television system.

Another object of the present invention is to provide a sweep system for distinguishing between signals differing in frequency in conjunction with a novel counting system for automatically averaging the resulting count for immediate and substantially continuous display of ratings and/or share of listeners for each of the television channels being monitored.

These and further objects and advantages of the invention will be more apparent upon reference to the following specification, claims and appended drawings wherein:

Figure 1:
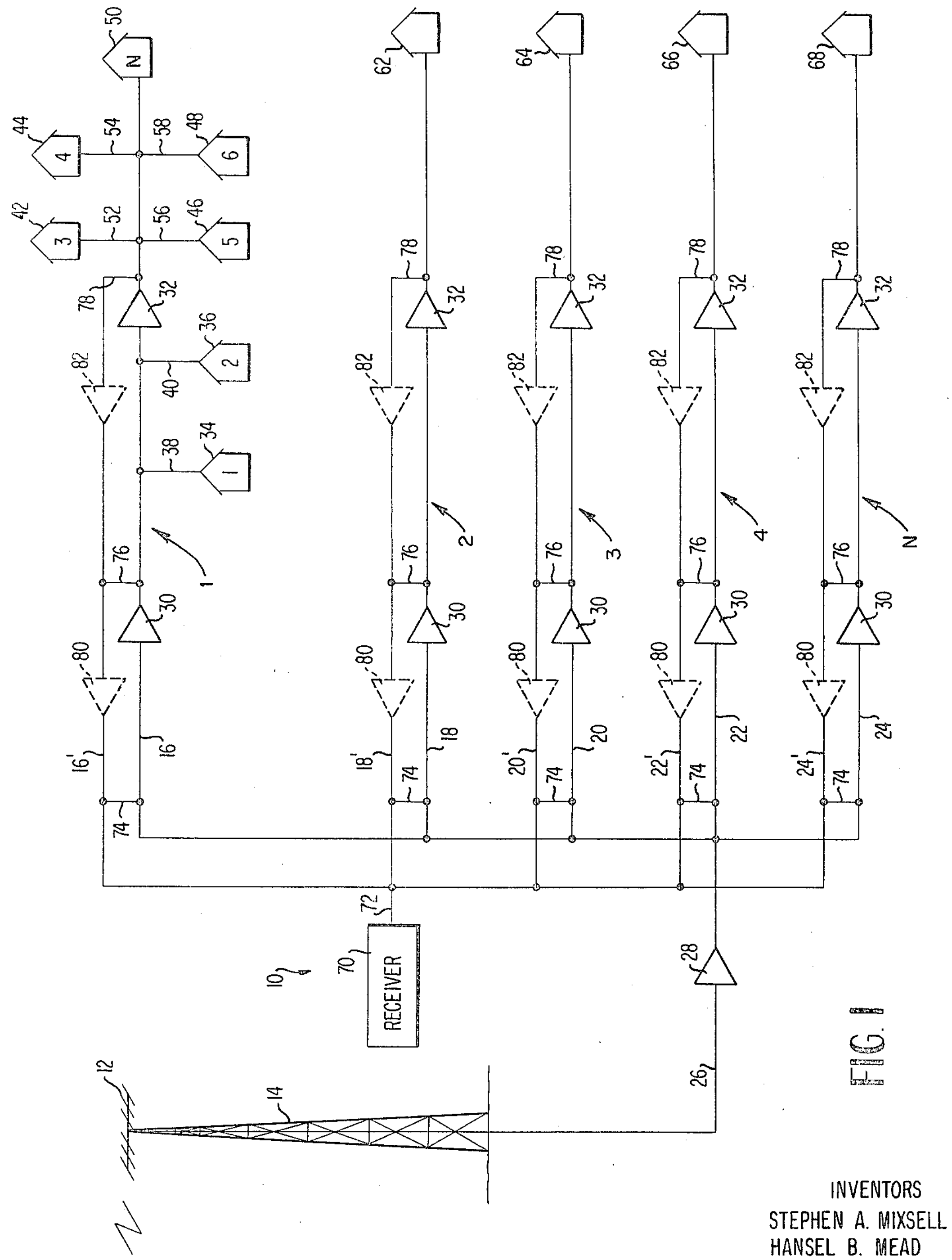
FIGURE 1 is a block diagram of a portion of a typical CATV system incorporating a local oscillator monitor in accordance with the present invention.

Referring to the drawings, the system of the present invention is generally indicated at 10 in FIGURE 1. It is used in conjunction with a conventional CATV system indicated as employing an antenna 12 mounted on a tower 14 and supplying signals received by the antenna 12 to a plurality of subscriber branch lines 16, 18, 20 and 22 and 24 by way of a cable 26 and cable amplifier 28. The amplifier 28 is conventionally provided in the cable to overcome cable losses. Branch lines 16, 18, 20, 22 and 24 are labeled Branches 1, 2, 3 and 4 and N respectively to indicate that any number of branch lines may be served by the community antenna television system.

Provided in branch line 1 are similar amplifiers 30 and 32 which boost the signal along the cable and as many amplifiers are provided as required to supply adequate signals to the number of homes containing a subscriber's set as may be connected to the particular branch. Similar amplifiers 30 and 32 are connected in the other branches, but more or less may be required, depending upon the length of the branch line and the number of homes serviced by the system. FIGURE 1 illustrates two homes 34 and 36 connected to branch line 16 by way of leads 38 and 40 between amplifiers 30 and 32. Five additional homes 42, 44, 46, 48 and 50 labeled Homes 3, 4, 5, 6 and N are connected by similar leads 52, 54, 56, 58 and 60 to branch line 1 beyond or downstream of amplifier 32. It is understood that any number of homes may be connected to the branch lines in advance of amplifier 30 as well as downstream of that amplifier. Homes 62, 64, 66 and 68 are illustrated as connected one each to the remaining branches, but it is understood that additional homes are supplied cable television signals by the remaining branches of the CATV system. Illustration of these additional homes has been omitted for the sake of clarity.

The novel monitoring system of the present invention comprises a receiver 70 of the general type shown in U.S. Patent 3,299,355 adapted to detect the difference in frequency between the local oscillators in the receiving sets of each of the homes connected to the respective branch lines. Receiver 70 is connected to the branch lines by way of a cable 72 and corresponding branch cables labeled 16′, 18′, 20′, 22′, and 24′. These cables generally run parallel to the respective branch lines for the greater part of their length and are connected to each segment of the branch lines separating an adjacent pair of cable amplifiers such as the amplifiers 28, 30 and 32. These connections are illustrated by the leads 74, 76 and 78 in FIGURE 1. Thus, the signals from the local oscillators connected to branch line 16 downstream of amplifier 32 are supplied to the receiver assembly by way of lead 78, the local oscillator signals from the segment of the branch line between amplifiers 30 and 32 by way of leads 76 and the local oscillator signals from the sets connected to branch lines 16 between amplifiers 28 and 30 by way of lead 74. Similar connections are provided for each of the other branch lines. Depending upon the length of the line and the strength of the local oscillator signals on the branches 16′, 18′, 20′, 22′ and 24′, one or more amplifiers such as the amplifiers shown in dashed lines at 80 and 82 may be provided in each of the monitoring branch lines.

As is well known, many of the community antenna systems are provided with small stations and in some cases these stations supply additional signals to the branch line such as weather, time, local affairs and educational programs. In additions, the station may include a provision for changing carrier frequencies so as to fill up one or more vacant channels in the community being serviced. For new installations, the receiver 70 may be provided at the location of such a CATV station and the monitor wires 72 and branch lines 16′, 18′, 20′, 22′ and 24′ may be wired into the homes along with the community antenna wires. In such cases, it usually becomes necessary to provide amplifiers such as the amplifiers 80 and 82 in the monitor lines. In existing community antenna systems, the receiver 70 may be centrally located in the area of the homes being serviced such that fewer or even no amplifiers are required in the monitor lines.

Figure 2:
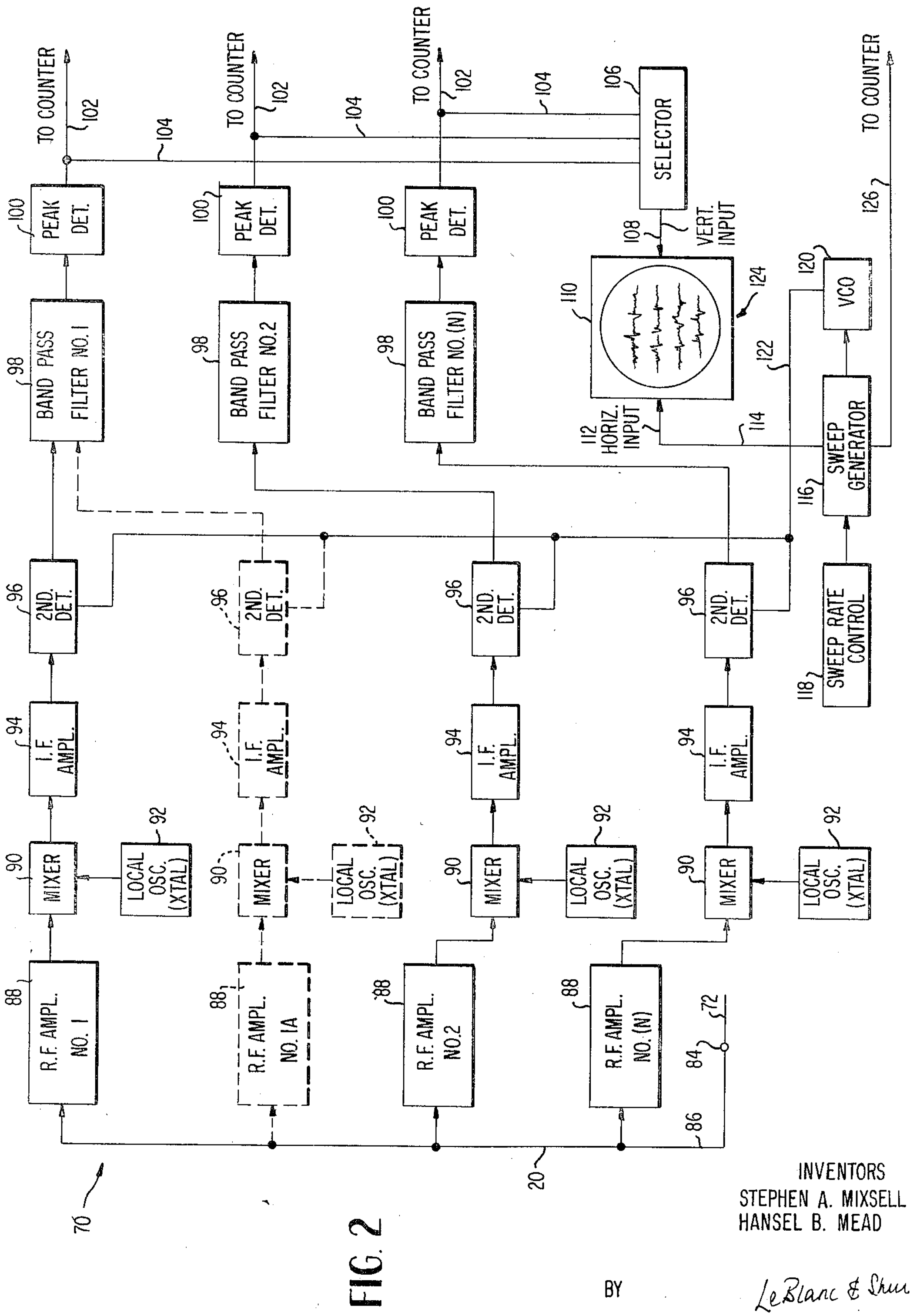
FIGURE 2 is a detailed block diagram of a major portion of the monitor receiver of FIGURE 2.

FIGURE 2 is a detailed block diagram of a major portion of the receiver 70 of FIGURE 1. In FIGURE 2, the incoming line 72 carrying the local oscillator signals is connected to an input terminal 84 which feeds these signals by way of lead 86 to a plurality of RF amplifiers 88 labeled RF amplifiers No. 1, 1A, 2 and N. The RF amplifiers are connected in respective receiving channels with the number of channels corresponding to the number of television transmitting stations whose audience is to be ascertained. At present, the maximum number of stations listed for any given area is nine, so that in order to cover such an area at least nine receiving channels would be required. However, most areas are serviced by less than nine stations so that ordinarily a lesser number of channels in the monitor receiver are required.

The signals from the RF amplifiers 88 pass to mixers 90 where they are mixed with signals from crystal-controlled local oscillators 92. The local oscillators for each channel operate at a different frequency so that the signal received at each of the RF amplifiers 88 is heterodyned down to a common IF frequency signal which is passed through IF amplifiers 94. The outputs from the IF amplifiers are coupled to second detectors 96 where the frequency is further reduced by a heterodyne process and the output of the second detector is applied to one of the bandpass crystal filters 98. The energy peaks coming out of the filters are sensed by peak detectors 100 and these peak detectors produce output pulses which are supplied by leads 102 to a counting system illustrated in detail in FIGURE 3 and described below. Each peak detector operates to provide the time derivative of the bandpass filter output. Thus, a zero crossing is generated each time an energy peak is reached at the bandpass filter. The peak detector zero crossing has a positive slope that is used to produce a counting pulse.

Figure 3:
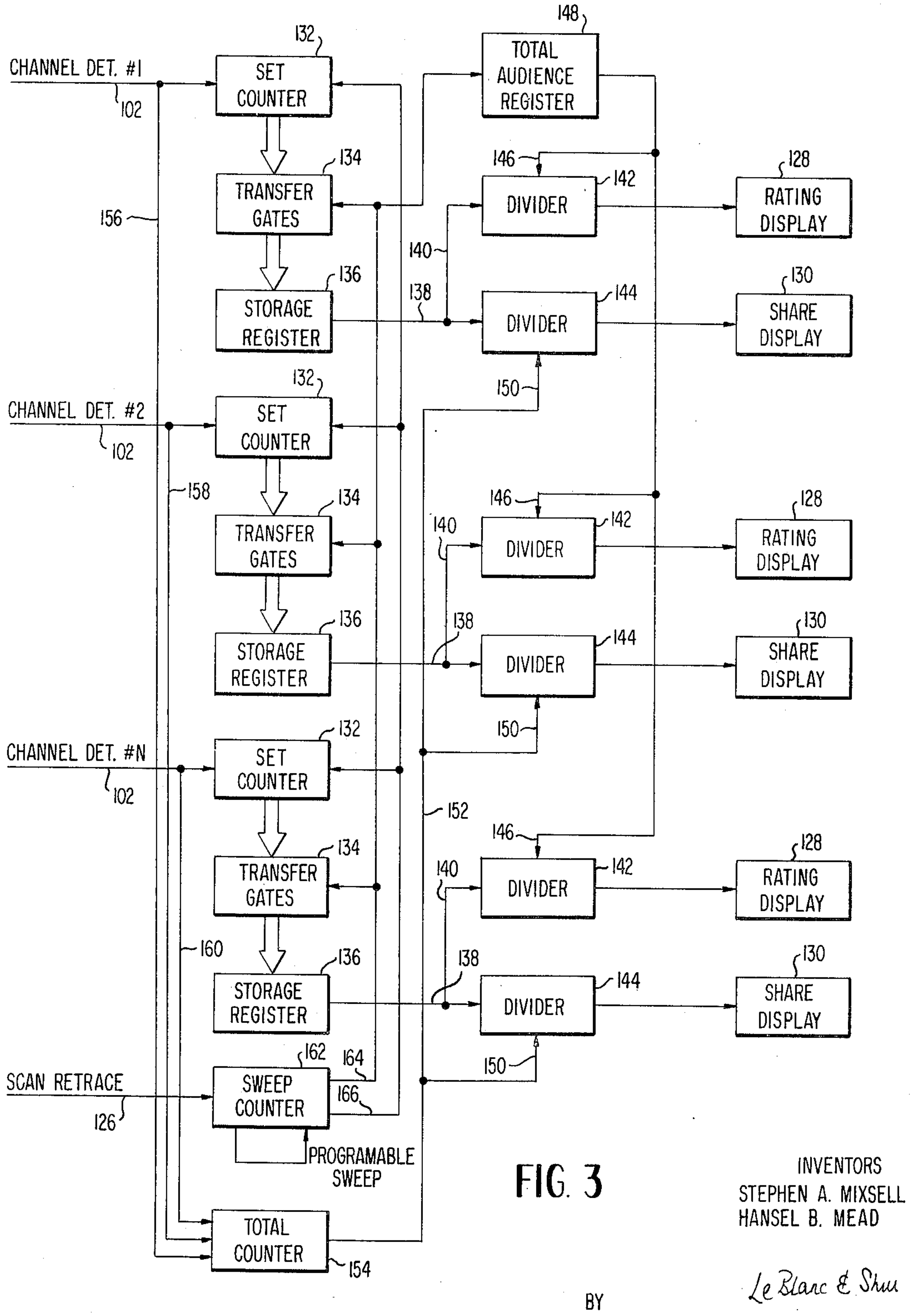
FIGURE 3 is a detailed block diagram of the counter forming part of the receiver of FIGURES 1 and 2.

At the same time that the pulses are applied to the counter of FIGURE 3, they are also applied by way of leads 104 to a selector switch 106 and by way of selector switch 106 to the vertical input 108 of a monitor oscilloscope 110. The horizontal input 112 of oscilloscope 110 is coupled by way of lead 114 to a sweep generator 116. The output of sweep generator 116 is under the control of a variable sweep rate control device 118 so that the sweep rate of the generator may be varied to produce sweeps at the desired rate such as once per second. The output of the sweep generator acts on a voltage controlled oscillator 120 so as to cause the output of the oscillator to be swept over a spectrum of frequencies in accordance with the output sweep of the generator 116. In the preferred embodiment, the output of voltage controlled oscillator 120 is swept over a frequency band 3.8 megacycles wide. This variable spectrum of frequencies is applied by way of lead 122 from the output of the voltage controlled oscillator 120 to the second detectors 96 of each of the receiver channels.

As previously pointed out, since in some areas there are as many as nine TV channels, there may be as many as nine or more receiving channels in the monitor 70 and this is indicated by the RF amplifiers labeled as number 1, number 2, etc. for each channel until number N is reached. However, present TV receivers in service employ either of two IF frequencies, namely 21.9 or 41.25 megacycles. This fact requires in some instances two survey receiver channels per TV channel being monitored. This is illustrated in FIGURE 2 by the channel including RF amplifier label number 1A, the second detector 96 of which is connected to the bandpass filter 98 of the first channel. For example, receiving channel number 1 might monitor all TV sets tuned to channel 7 and employing an IF frequency of 21.9 megacycles. Receiving channel number 1A may similarly monitor all TV sets tuned to the same TV channel 7 but utilizing an IF frequency of 41.25 megacycles. Since both of these receiver channels monitor the same television channel, the output from the second detector 96 of the dashed line channel number 1A is preferably connected directly to the bandpass filter of channel number 1 and a separate bandpass filter is not required.

The count is obtained by employing the spectrum analyzer technique where voltage controlled oscillator 120 is swept through a frequency range and the heterodyne signals produced from the incoming local oscillator signals are detected at the output of the bandpass filters. The optimum sweep rate and filter pass band are functions of the number of carriers distributed in the band of interest, the stability of the carriers, the ambient noise level or presence of interfering signals. For the system of the present invention a sweep rate of from about once per second to about once every 10 seconds is preferred and a bandwidth for the filters 98 should be about 7.5 to 8 kilocycles in order to distinguish local oscillator signals differing by as little as 50 to 100 cycles per second. Reference may be had to assignee's copending application Ser. No. 608,589, filed Jan. 11, 1967 which is incorporated herein by reference, for a more detailed discussion of a preferred filtering system for the present invention. However, it is understood that the filtering arrangement shown in Patent 3,299,355 may be employed if desired.

The monitor oscilloscope 110 is provided to normalize receiver gain and to determine the validity of the count being recorded. A raster type display is presented on the oscilloscope to the operator as illustrated at 124 with each base line associated with its own bandpass filter. Thus a spectrum display of all channels being surveyed is available, allowing incorrect counts resulting from excessive noise or interference to be negated at the operator's option.

The reason for providing separate channels for each group of local oscillator signals is that at television frequencies the various channels are widely separated and it is not at the present time possible to employ common circuitry having sufficient bandwidth to detect all settings of the various local oscillators. For example, the most commonly used channels for TV operate at from 80 to 130 megacycles and from 200 to 260 megacycles, thus necessitating an RF system having approximately a three-to-one bandwidth. The unit of FIGURE 2 has been described in conjunction with VHF reception and while the same overall system can be made to function for reception in the UHF band, that is from 450 to 900 megacycles, suitable modification of the equipment is required. It should be pointed out that operation over the higher band poses no serious difficulty since similar devices may be used with the element size and the phasing commensurate with the portion of the UHF spectrum being worked at the time.

The operation of the system of this invention is based on the fact that while the local oscillators in all the same type sets tuned to a particular TV channel are theoretically operating at the same frequency, they are in fact operating at slightly different frequencies, each peculiar to the parameters, tuning adjustment, etc. of the individual set. By employing bandpass filters 98 of sufficiently narrow pass band, any single local oscillator may be isolated, since the output from the filter will peak at the instant the frequency of the local voltage controlled oscillator 120 is equal to the frequency of the incoming signal in second detector 96. While some signals may be lost to noise and other factors may exist which may tend to make the sample not completely accurate, these inaccuracies tend to average out over the very large number of sweeps provided by the device of this invention so that on a percentage basis the survey is extremely accurate.

FIGURE 3 is a detailed block diagram of the counting system adapted to be connected to the output leads 102 of the system of FIGURE 2 on which appear pulses representative of the count. These leads are again illustrated in FIGURE 3 along with a separate lead 126 and supply a signal to the total counter of FIGURE 3 from the sweep generator 116 of FIGURE 2.

Referring to FIGURE 3, for each of the three channels shown representative of three possible television channels to which the receiving sets may be tuned, there is a rating display device 128 and a share display unit 130. Rating display 128 displays the number of sets tuned to a particular station or program in relation to the total number of sets or total audience being monitored. Share display 130 gives an indication of the share of the actual listening audience that a program may have, i.e., the number of listening sets tuned to a particular TV station or program in relation to the total number of sets actually turned on or in operation. Rating display devices 28 and share display devices 30 may take any conventional form such as a trace recorder, a visible light display, a number indicator or any desired combination of the above.

The pulses on the leads 102 to be displayed in units 128 and 130 are supplied to a set counter 132 in the first channel. Only one channel will be described in detail since it is understood that the remaining channels are of identical construction. Set counter 132 is reset once each sweep but before it is reset, its count is transferred through a conventional transfer gate 134 to a storage register 136. Storage register 136 is a summing device which produces an electrical output corresponding to the total number of pulses which have appeared on line 102 during the particular monitoring period. The electrical output signal from storage register 136 is passed by way of leads 138 and 140 to a pair of dividers 142 and 144 with the divider 142 feeding rating display device 128 and divider 144 supplying an electrical signal to share display unit 130.

Connected to a second input of divider 142 by way of lead 146 as an electrical output signal from a total audience register 148. The second input 150 of divider 144 is connected by lead 152 to the electric output of a total counter 154. This latter counter totalizes the input pulses supplied to all channels of the counting system of FIGURE 3 and is connected to the respective input leads 102 by way of lines 156, 158, and 160. Finally, a scan retrace signal from sweep generator 116 of FIGURE 2 is fed by way of lead 126 to a sweep counter 162 programmable so as to divide the actual number of scan retrace signals from sweep generator 116 by any of a number of predetermined amounts so as to produce output sweeps selectively variable from in the neighborhood of one per second to approximately one per minute on its output leads 164 and 166. That is, after a predetermined and variable number of scan retrace signals have been received by the sweep counter 162 by way of lead 126, it produces an output pulse on lead 164 which is fed to the transfer gate 134. After a short delay built into the sweep counter 162, an output pulse also appears on its output lead 166, which is supplied to the set counter 132.

In operation, the pulses are received by way of leads 102 and supplied to the set counters 132 in each of the channels which count the number of pulses received during one cycle of sweep counter 162. After a certain predetermined and adjustable number of scan retrace signals have been applied to the sweep counter 162 by way of lead 126 from the sweep generator 116 of FIGURE 2, a pulse appears on lead 164 energizing transfer gates 134. Thus an output signal representative of the count of each set counter 132 passes through the transfer gate and is stored in storage register 136 which then produces a corresponding output on lead 138 which is applied to one of the inputs of each of the dividers 142 and 144. After a short delay a pulse appears on sweep counter output 166 which is applied to the set counters 132 resetting them to zero so they are ready to count pulses during the next period or cycle of counter 162. Pulses from all the input leads 102 are supplied by way of leads 156, 158 and 160 to the total counter 154 which produces an output signal representative of the running total of all pulses in all the channels.

The electrical output from total counter 154 is applied by way of lead 152 to the second input of each of the dividers 144. Thus, in divider 144 the running total of all the pulses in a given channel recorded in storage register 136 is divided by the running total of all pulses from total counter 154 and the divisor is represented by an electrical signal supplied from divider 144 to share display 130 which may be an electrical display device or a mechanical display device actuated by the electrical input signal from divider 144.

Total audience register 148 is pre-adjusted to advance one step representative of the total number of television viewer sets being monitored during each sweep. To this end, output lead 164 from the sweep counter 162 is also connected to the total audience register 148 to advance this register one step during each sweep. That is, by way of example only, if the total number of sets connected into the monitoring system is 200, then the signal at the output of the total audience register will be increased by a factor representative of 200 by each pulse from sweep counter 162. This output is applied by lead 146 to one of the inputs of divider 142. The output from this divider is fed to the rating display 128 which again may be electrical or an electrically operated mechanical device of conventional construction. The result is that divider 142 produces an output representative of the running total of counts in a given channel divided by the output from total audience register 148 which is representative of the total audience times the number of pulses from counter 162. This gives a running average rating displayed in unit 128.

It is apparent from the above that the present invention provides an improved audience sampling system for determining the listening habits of radio and television users and particularly one adapted for use in ascertaining the listening habits of subscribers to community antenna television systems. An important feature of the present invention includes the provision of an adjustable sweep counter for updating the output data at the deisred rate and incorporating features for automatically compensating the output display in accordance with the sweep rate. An additional important feature of the present invention resides in the fact that in addition to a substantially continuous, updated display, the rapid and frequency collection of information provided by the system of this invention makes it possible to average out incorrect results caused by electrical interference and other factors. It is necessary to periodically reset the counting system of FIGURE 3 depending upon the size of the registers and counters, but this may be done quite rapidly with conventional equipment so that little or no loss in output information is occasioned.

A further important feature of the present invention resides in its compatability with existing aircraft and tower type units such as that disclosed and described in assignee's U.S. Patent 3,299,355. Through the relatively simple and inexpensive modifications herein set forth, the system of that patent is completely adaptable to CATV systems where the local oscillator signals are not radiated from subscriber antennas but instead appear on the CATV cables.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An audience survey system comprising a plurality of receiving sets having local oscillators connected to a signal supply cable forming part of a CATV system, a monitor connected to said cable for receiving local oscillator signals from said sets, means in said monitor for separating said signals by frequency into separate bands representative of programs to which said sets may be tuned, means in said monitor for counting the number of signals in each frequency band, means in said monitor for repeatedly counting the same sets, and means coupled to said counting means for automatically averaging the count in accordance with the repetition rate.

2. An audience survey system comprising a plurality of television receivers, a CATV cable connected to each of said receivers, a monitor connected to said cable for receiving local oscillator signals from said receivers, a plurality of channels in said monitor separating said local oscillator signals into separate frequency bands representative of the different programs to which said receivers may be tuned, sweep means coupled to said channels for converting said local oscillator signals into pulses, a counter coupled to each of said channels for counting the number of pulses in each channel, a divider coupled to said counter for dividing the number of pulses in each channel by the total number of pulses in all channels, and means coupled to said divider for displaying the results of the count.

3. An audience survey system comprising a plurality of television receivers, a CATV cable connected to each of said receivers, a monitor connected to said cable for receiving local oscillator signals from said receivers, a plurality of channels in said monitor separating said local oscillator signals into separate frequency bands representative of the different programs to which said receivers may be tuned, sweep means coupled to said channels for converting said local oscillator signals into pulses, a counter coupled to each of said channels for counting the number of pulses in each channel, a divider coupled to said counter for dividing the number of pulses in each channel by the total number of receivers connected to said monitor, and means coupled to said divider for displaying the results of the count.

4. An audience survey system comprising a plurality of television receivers, a CATV cable connected to each of said receivers, a monitor connected to said cable for receiving local oscillator signals from said receivers, a plurality of channels in said monitor separating said local oscillator signals into separate frequency bands representative of the different programs to which said receivers may be tuned, sweep means coupled to said channels for converting said local oscillator signals into pulses, a counter coupled to each of said channels for counting the number of pulses in each channel, means coupled to said counter for displaying the results of the count, said sweep means including a sweep generator, a variable sweep counter, means coupling said sweep generator to said sweep counter for counting the number of sweeps, and a divider between said channels and said display means and coupled to said sweep counter for dividing the number of pulses in each channel by the number of sweeps.

5. Apparatus according to claim 4 including a share display coupled to said divider, a total counter coupled to said channels for counting the total number of pulses in all channels, and means coupling the output of said total counter to said divider.

6. Apparatus according to claim 4 including a rating display coupled to said divider, a total audience register coupled to said sweep counter for registering the total number of receivers being monitored times the number of sweeps, and means coupling the output of said total audience register to said divider.

References Cited

UNITED STATES PATENTS

| | | | |
|---|---|---|---|
| 3,048,780 | 8/1962 | Diambra et al. | 325—31 |
| 3,299,355 | 1/1967 | Jenks | 325—31 |
| 3,230,302 | 1/1966 | Bruck et al. | 325—31 |

ROBERT L. GRIFFIN, Primary Examiner
A. J. MAYER, Assistant Examiner

U.S. Cl. X.R.

179—2